July 15, 1924.
W. J. WRIGHTON
LENS MOUNTING
Filed April 18, 1922
1,501,085
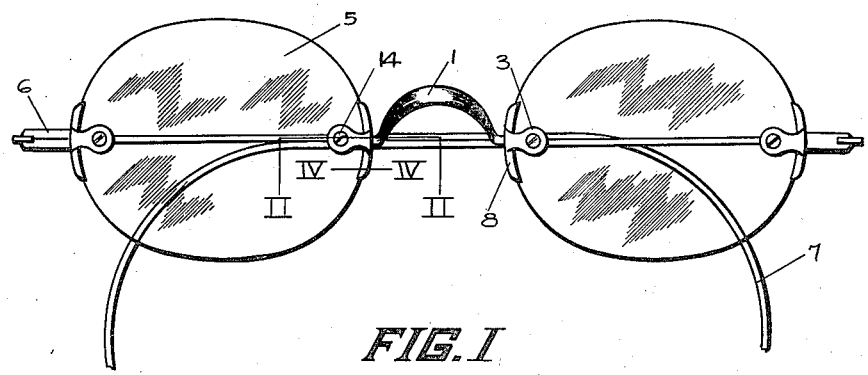
FIG.I
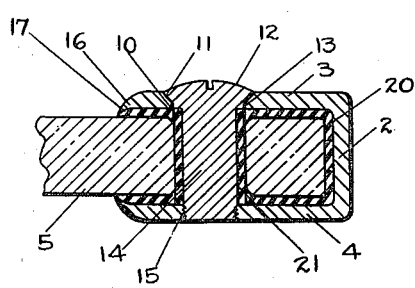
FIG.II
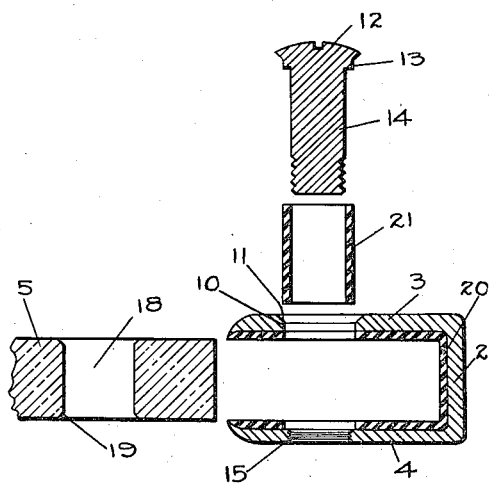
FIG.III
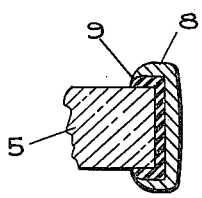
FIG.IV
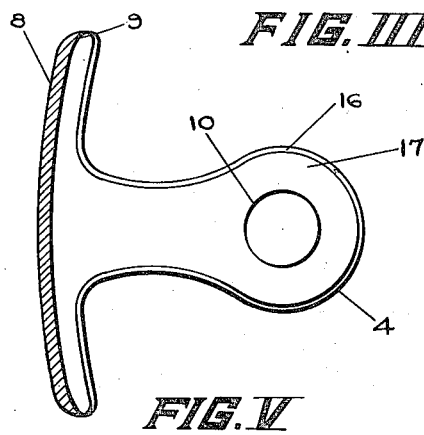
FIG.V
INVENTOR
W. J. WRIGHTON
BY
ATTORNEYS Patented July 15, 1924.

1,501,085

UNITED STATES PATENT OFFICE.

WILLIAM J. WRIGHTON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS MOUNTING.

Application filed April 18, 1922. Serial No. 554,950.

*To all whom it may concern:*

Be it known that I, WILLIAM J. WRIGHTON, a citizen of the United States, residing at Southbridge, in the county of Worcester and State of Massachusetts, have invented certain new and useful Improvements in Lens Mountings, of which the following is a specification.

This invention relates to new and novel improvements in lens mounting and has particular reference to an improved manner or process of mounting the lens and an improved structure particularly lending itself to carrying out this process.

One of the principal objects of the present invention is the provision of a structure in which the lens shall be securely clamped in position with a certain cushioning action tending to eliminate or minimize breakage of the lens through improper mounting.

A further object of the present invention is the provision of a structure which will firmly adhesively but resiliently unite the lens and the mounting therefor, tending to hold the same against any accidental loosening of the lenses.

Another object of the invention is the provision of a process and construction which will aid in locking the lens screw in position and in tightening the engagement between the lens, lens screw and mounting in a manner to render most permanent the connection of the several parts.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvements.

Figure II represents a sectional view taken as on the line II—II of Figure I.

Figure III represents a sectional view of the several parts in position for assembling.

Figure IV represents a sectional view taken as on the line IV—IV of Figure I.

Figure V represents a longitudinal sectional view through the edge engaging portion of the strap.

In the drawings, in which similar characters of reference are employed to denote corresponding parts throughout the several views, the numeral 1 designates a spectacle bridge bearing at each end lens attachments comprising the strap or edge engaging portion 2 and the clip ears 3 and 4 engaging opposite sides of the lens 5. Similar attachments are disposed at the outer edge of the lenses and provided with the end pieces 6 carrying the temples 7 for retaining the mounting in position on the face.

It is to be understood that while I have illustrated a conventional form of spectacle mounting, my construction is equally applicable to any other known type of mounting.

It is to be noted that what I have termed the edge engaging portion 2 is provided at each side with slight lateral flange portions 8 terminating in an inwardly projecting rib 9, the spacing of the ears 8 being such as to just receive a lens therebetween, forming a substantially U-shaped beam embracing the lens, the arms of the U being capable of being bent in toward each other or outwardly according to the thickness of lens fitting within the pocket thus provided. The flange 9 centrally at each side continues in the ears 3 and 4, the ear 3 having the large aperture as at 10 formed therein with the adjacent countersink 11 for the head 12 and shoulder portion 13 of the lens securing screw 14, while the ear 4 has an aperture as at 15 for engagement with the lower threaded end of the screw 14. It is to be noted that the ears 3 and 4 are each provided with the inwardly deflected edge flange portion 16 providing a slight space or pocket 17.

In the use of my improved mounting I preferably drill the lens 5 with the aperture as at 18 of substantially the same diameter as the diameter of the aperture 10 in the clip ear 3, the same being larger than the aperture 15 to receive the screw, and being usually slightly counter sunk on each face, as is indicated at 19.

The strap, on the other hand, is preferably provided within the space enclosed by the edge flanges 9 and 16 with a liner or adhesive coat 20 which is preferably formed from gutta-percha or similar material, such as employed by tailors, for example, that is readily softenable to a tacky or sticky condition under a low degree of heat, but when so heated will possess great adhesive properties and securely adhere to any adjacent surface. The strap having been provided with this liner or coating, the lens is then preferably inserted. I then place over the body 14 of the screw a tube 21 of similar heat softenable adhesive material and insert the screw and tube through the apertures 10 of the strap and 18 of the lens so that it comes into proper position against the adhesive material 20 surrounding the far side of the strap.

The parts having been thus assembled the entire structure is preferably, through an electric heater, or the like, submitted to a slight warmth which will be sufficient to soften the material 20—21 and render it plastic and tacky. With the material in this condition the screw 14 is then tightened to properly secure the parts together, this tightening compressing the material 20, causing it to most firmly adhere to the opposed surfaces of the lens and strap and at the same time squeezing up the bushing or sleeve 21 and causing the adjacent lining portion of the strap to flow and unite therewith, filling up tightly the lens screw aperture so that the lens is mounted extremely tight and yet resiliently by a yielding substance preventing any undue strain tending to crack the lens and imparting to the parts a slight yielding potential as under shock, while at the same time securely holding it against loosening.

I would call particular attention to the web feature as at 8 on both sides of the strap which serves to impart much rigidity to the lens contacting portions thereof, while being capable of sufficient distortion or bending by suitable pliers to cause the edge engaging portion 2 to properly fit any desired shape or size of lens.

I claim:

1. The process of mounting a lens consisting in lining the strap with heat softenable gutta-percha, inserting a drilled lens within the strap, applying heat to soften the gutta-percha, and tighting a lens screw through the aperture in the lens to draw the strap ears into clamping engagement with the lens whereby the gutta-percha is compressed to tightly unite the parts.

2. The process of mounting a lens consisting in forming a screw receiving aperture in a lens, forming an embracing clip with screw receiving apertures, mounting a lens within the clip with an interposed soft adhesive between the adjacent faces of the clip and lens, and drawing the clip ears together with a fastening device operating through the apertures of the clip and lens to compress the adhesive between said faces.

3. As an article of manufacture, a lens attaching clip comprising a lens edge engaging portion and lens face engaging ears carried thereby, said ears having fastener receiving apertures formed therein, and an adhesive liner for the edge and face engaging portions of the clip, said liner having a permanent inherent resiliency, whereby when a lens is secured within the strap by the adhesive the inherent resiliency of the adhesive will permit the lens to yield relative to the strap, without loosening and prevent breakage thereof by temporary fracturing strains.

4. A lens strap comprising a lens edge engaging portion, lens face engaging flanges carried thereby and having inturned edge portions and clip ears carried by the flanges, said clip ears being pierced to receive a fastening device and an adhesive liner for the strap, said liner including ingredients which will become tacky upon application of heat thereto and which will form a yielding cushion adhering to the strap and lens upon subsequent cooling.

5. The process of mounting a lens consisting in forming a lens with an aperture, forming a mounting with lens embracing ears having corresponding apertures, placing a heat softenable adhesive within the strap, inserting the lens within the strap, inserting a heat softenable adhesive through one of the clip ear apertures into the aperture in the lens, passing a fastening device through the aligned apertures and the adhesive, softening the adhesive, and subsequently tightening the fastening device.

6. As an article of manufacture, a lens clip comprising a strap portion and a pair of clip ears carried thereby, said parts having lateral flanges forming adhesive receiving pockets, and the clip ears having aligned fastener receiving apertures formed therein, the diameter of one of the apertures being greater than the other, whereby a fastening device and a surrounding yieldable bushing may be inserted through the larger aperture and the clip ear adjacent the smaller aperture will limit the movement of the bushing within the clip.

7. As an article of manufacture, a lens clip comprising a strap portion and a pair of clip ears carried thereby, said parts having adhesive receiving pockets formed therein and the clip ears having aligned fastener receiving apertures of different diameters, the aperture of less diameter being formed with a threaded wall to engage a fastening screw, and the diameter of the other aperture being sufficiently larger to receive both a fastening screw and a surrounding tube therefor, the clip ear adjacent the threaded aperture forming a limiting abutment for such tube, and a fastening device engaged in the apertures having a threaded portion fitting the threaded aperture and an enlargement fitting the other aperture, said enlargement forming a shoulder adapted to engage an inserted tube and compress it against the abutment portion of the opposed ear as the screw is tightened.

WILLIAM J. WRIGHTON.